(12) United States Patent
Kellogg et al.

(10) Patent No.: US 8,065,261 B2
(45) Date of Patent: Nov. 22, 2011

(54) METHODS AND SYSTEM TO COMPARE DIFFERENT OPTIONS IN A DECISION MAKING PROCESS

(75) Inventors: Rodney Kellogg, Guntersville, AL (US); James Bathurst, Huntsville, AL (US); Jeffrey Buehrle, Huntsville, AL (US); Donald Mikell, Huntsville, AL (US); Gregory Sollie, Rogersville, AL (US); Sharon Sollie, Rogersville, AL (US)

(73) Assignee: KSMI Decisions LLC, Baileyton, AL (US)

( * ) Notice: Subject to any disclaimer, the term of this patent is extended or adjusted under 35 U.S.C. 154(b) by 839 days.

(21) Appl. No.: 12/081,352

(22) Filed: Apr. 15, 2008

(65) Prior Publication Data
US 2009/0055337 A1   Feb. 26, 2009

Related U.S. Application Data

(60) Provisional application No. 60/935,650, filed on Aug. 23, 2007.

(51) Int. Cl.
*G06F 15/00* (2006.01)
*G06F 15/18* (2006.01)

(52) U.S. Cl. ............... 706/62; 706/45; 706/46; 706/47; 706/52; 705/26.1; 705/26.63; 705/26.64; 705/26.7

(58) Field of Classification Search ................. None
See application file for complete search history.

(56) References Cited

U.S. PATENT DOCUMENTS

| | | | | |
|---|---|---|---|---|
| 6,151,565 A * | 11/2000 | Lobley et al. | ..................... | 703/2 |
| 7,287,017 B2 * | 10/2007 | Pellinat | .......................... | 706/59 |
| 7,676,446 B2 * | 3/2010 | Zangwill | ......................... | 706/60 |
| 2005/0086187 A1 * | 4/2005 | Grosser et al. | .................. | 706/47 |
| 2007/0239650 A1 * | 10/2007 | Zangwill | ......................... | 706/60 |
| 2007/0260631 A1 * | 11/2007 | Feied et al. | .................... | 707/102 |

\* cited by examiner

*Primary Examiner* — Omar Fernandez Rivas
(74) *Attorney, Agent, or Firm* — Maier & Maier, PLLC (57) ABSTRACT

A method of comparing a plurality of decision options is provided. The method can include entering a plurality of factors; determining a plurality of decision options based on the plurality of factors; calculating a score for the plurality of factors; ranking each decision option based on the total score of each factor; outputting the rankings for each decision option.

20 Claims, 10 Drawing Sheets

| | Decision Option A | Decision Option B | Decision Option C | Decision Option D |
|---|---|---|---|---|
| Factor 1 | 42 | 23 | 32 | 25 |
| Factor 2 | 24,777 | 55,000 | 27,000 | 26,500 |
| Factor 3 | 600 | 325 | 450 | 387 |
| Factor 4 | 7 Stars | 7 Stars | 8 Stars | 6 Stars |
| Factor 5 | 8 Stars | 8 Stars | 9 Stars | 9 Stars |
| Factor 6 | 14.00 | 14.50 | 13.80 | 13.60 |
| Factor 7 | 7.50 | 7.40 | 7.20 | 7.90 |
| Factor 8 | 24 | 26 | 27 | 28 |
| Factor 9 | No | Yes | Yes | Yes |
| Factor 10 | Red | Green | White | Blue |

| Option | Score |
|---|---|
| Decision Option A | 2553 |
| Decision Option B | 1960 |
| Decision Option C | 2359 |
| Decision Option D | 2118 |
| Decision Option E | 1373 |
| Decision Option F | 1696 |
| Decision Option G | 1633 |
| Decision Option H | 1936 |
| Decision Option I | 1931 |
| Decision Option J | 2456 |

○ FACTORS  ◉ OPTIONS  ○ DATA  ○ RESULTS  ○ GRAPH Results  ○ GRAPH Factors
Pop-Up Summary of Results at any time  ○ CLEAR  ◉ SUMMARY You can turn ON or OFF any of the Decision possibilities below by using the ON/OFF buttons.... or if you want to add your own, just erase one of these decision options and enter your own.

New Decisions
Save or Load

ON  Decision Option A
ON  Decision Option B
ON  Decision Option C
ON  Decision Option D
ON  Decision Option E
ON  Decision Option F
ON  Decision Option G
ON  Decision Option H
ON  Decision Option I
ON  Decision Option J

Fig. 10

METHODS AND SYSTEM TO COMPARE DIFFERENT OPTIONS IN A DECISION MAKING PROCESS

CROSS-REFERENCE TO RELATED APPLICATIONS

This application claims priority to U.S. Provisional Application 60/935,650, filed Aug. 23, 2007 and entitled DECISION MAKING AND ADVERTISING ENGINE, the entire contents of which are hereby incorporated by reference.

BACKGROUND OF THE INVENTION

Existing online search tools, such as Google, Yahoo and Microsoft, provide searching parties with near-instantaneous access to extremely broad amounts of products and data. Generally, the data sought by the searching parties is used to assist resolving a problem or providing assistance in a decision making process. In some known searches, the searching party is interested in purchasing a particular product from a group of similar products. The data returned from these searches is generally not returned or displayed in a manner that is helpful to the searching party. Moreover, known search engines do not return decision making search results that encompass the factors used in a decision or the importance of the factors in the decision.

Some known search engines and search tools return the search results in a list form, which provide little guidance to the searching party as to what search result or results may be most relevant. As a result, the searching party is required to spend additional time attempting to tabulate and compare the returned data. As such, the searching party is required to use an additional application to acquire the search results.

Also, advertisers desire to present advertisements to searching parties. Generally advertisers are required to purchase keywords that, when searched, will display an advertisement from the advertiser. However, because many keywords are extremely broad, the bidding for keywords is often very expensive and results in the display of advertisements that are not relevant to the searching party's desired search results.

BRIEF DESCRIPTION OF THE INVENTION

In one exemplary embodiment, a method of comparing a plurality of decision options is provided. The method can include entering a plurality of factors; determining a plurality of decision options based on the plurality of factors; calculating a score for the plurality of factors; ranking each decision option based on the total score of each factor; outputting the rankings for each decision option.

In another exemplary embodiment, a computer program embodied on a computer-readable medium is provided. The computer program may include at least one code segment configured to instruct a computer to receive a plurality of factors; determine a plurality of decision options based on the plurality of factors; calculate a score for the plurality of factors; rank the plurality of decision options based on the total score of each factor; output the rank of the plurality of decision options.

In yet another exemplary embodiment, a decision making system is provided. The system may include at least one server coupled in communication with at least one first party and at least one second party, the at least one server configured to receive a plurality of factors; determine a plurality of decision options based on the plurality of factors; calculate a score for the plurality of factors; rank the plurality of decision options based on the total score of the plurality of factors of each decision option; output the rank of the plurality of decision options.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 6 is an illustration of a raw data page that may be used with the system shown in FIG. 1;

DETAILED DESCRIPTION OF THE INVENTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
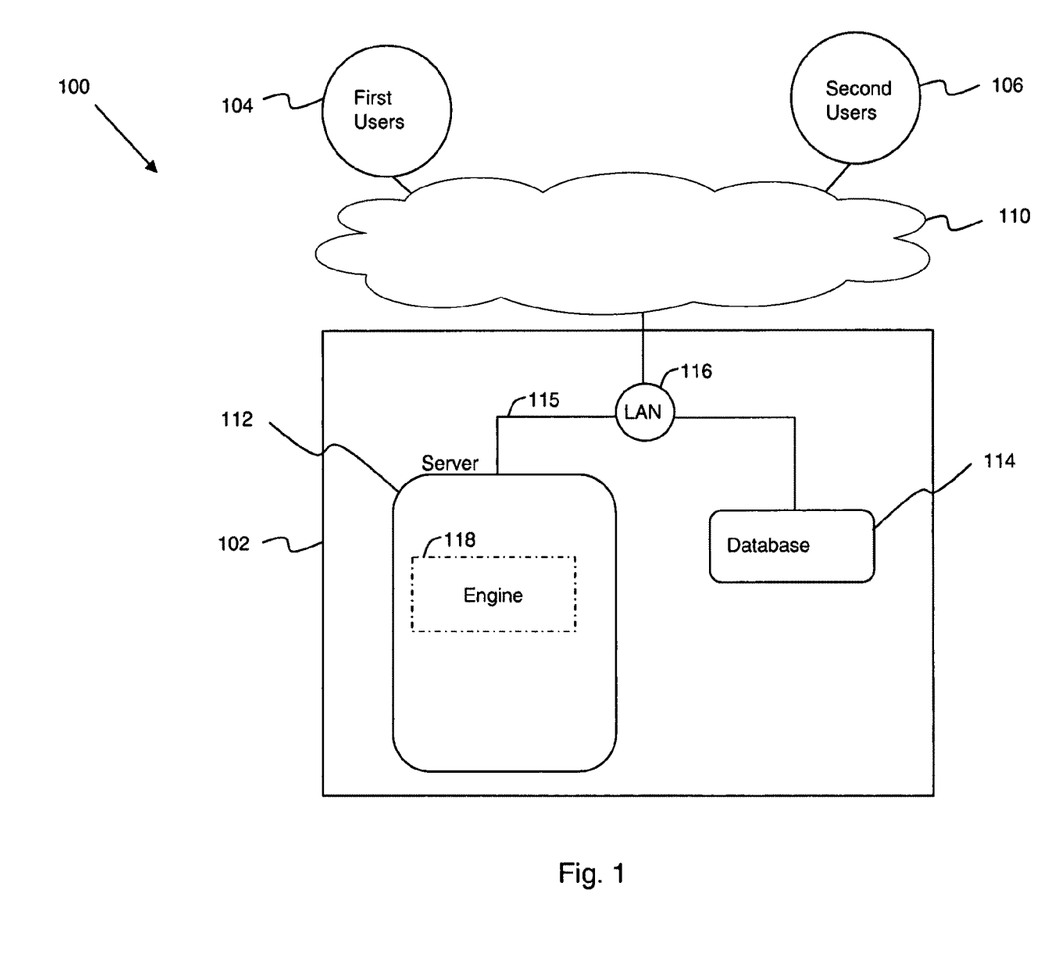
FIG. 1 is a schematic illustration of a decision making system.
Figure 2:
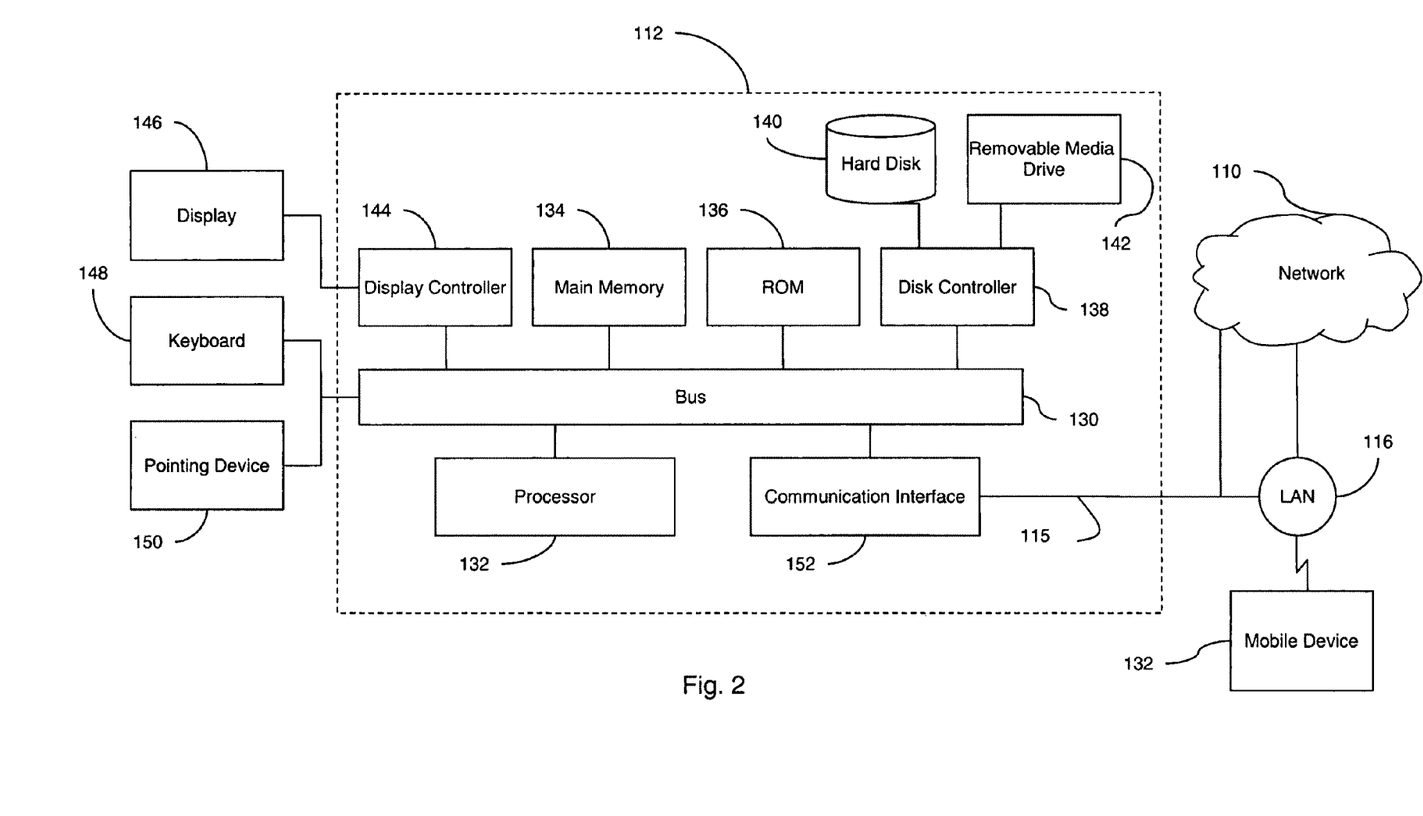
FIG. 2 is an enlarged schematic illustration of the system shown in FIG. 1.

FIG. 1 is a schematic illustration of a decision making system 100. FIG. 2 is an enlarged schematic illustration of system 100. In the exemplary embodiment, system 100 may include a web portal 102, at least one first user 104 and at least one second user 106. In the exemplary embodiment, each first user 104 and each second user 106 may be coupled in communication to web portal 102 using a network 110. In the exemplary embodiment, network 110 may be the Internet. In an alternative embodiment, network 110 may be a local area network (LAN), a wireless LAN, a wide area network (WAN) and/or any other type of connection that enables system 100 to function as described herein. System 100, in the exemplary embodiment, may also include at least one server 112 and at least one database 114. In the exemplary embodiment, server 112 may be coupled in communication to database 114 using a network connection 115 that is coupled to a local network 116 such as, but not limited to, a LAN, a wireless LAN, a WAN and/or any other connection that enables system 100 to function as described herein.

In the exemplary embodiment, first users 104 may be any entity that desires to make a decision on a plurality of decision options using a plurality of factors. Each factor represents a specific consideration that a user may take into account when selecting the decision option. System 100 may be used with decision analyses including, but not limited to, the purchase of any type of products or services, the purchase of any type of real estate, determining which school to attend, determining which career path to pursue or any other decision. In one embodiment, first users 104 may be the general public. Second users 106 may be any entity that is interested in the decision analysis conducted by first users 104. In one embodiment, second users 106 may be any entity that desires to advertise decision options to first users 104. In another embodiment, second users 106 may include, but not limited to, advertising agencies, advertisers and specific product entities.

In the exemplary embodiment, server 112 may include at least one engine 118 programmed therein. Alternatively, a plurality of servers 112 may be used, wherein each server 112 may include at least one engine 118 programmed therein. As used herein, the term "engine" may refer to a collection of logic and/or code that may be executed on server 112 or any other type of device or processor that is capable of producing a response. In the exemplary embodiment, first engine 118 may be a decision engine. In one embodiment, server 112 may include a second engine (not shown) that may be a connector engine and a third engine (not shown) that may be a marketing engine. In another embodiment, server 112 may include any type of engines or any number of engines that enable system 100 to function as described herein.

In the exemplary embodiment, the term "server" is not limited to just those integrated circuits referred to in the art as a computer, but broadly refers to a processor, a microcontroller, a microcomputer, a programmable logic controller, an application specific integrated circuit and other programmable circuits. These aforementioned terms may be used interchangeably herein. In the exemplary embodiment, server 112 may include a bus 130 or other communication mechanism for communicating information, and a processor 132 coupled with bus 130 for processing the information. In one embodiment, a plurality of processors 132 may be arranged in a multi-processor arrangement to facilitate faster processing as compared to a single processor arrangement. In the exemplary embodiment, system 100 may also include a main memory 134, such as a random access memory (RAM) or other dynamic storage device (e.g., dynamic RAM (DRAM), static RAM (SRAM) and synchronous DRAM (SDRAM)) coupled to bus 130 for storing information and instructions to be executed by processor 132. In addition, main memory 134 may be used for storing temporary variables or other intermediate information during the execution of instructions by processor 132. System 100 may further include a read only memory (ROM) 136 or other static storage device (e.g., programmable ROM (PROM), erasable PROM (EPROM) and electrically erasable PROM (EEPROM)) coupled to bus 130 for storing static information and instructions for processor 132.

System 100 may also include a disk controller 138 coupled to bus 130 to control one or more storage devices for storing information and instructions. In the exemplary embodiment, storage devices may include, but not limited to, a magnetic hard disk 140 and a removable media drive 142 (e.g., floppy disk drive, read-only compact disc drive, read/write compact disc drive, compact disc jukebox, tape drive and removable magneto-optical drive). The storage devices may be coupled to system 100 using any appropriate device interface known to one having ordinary skill in the art (e.g., small computer system interface (SCSI), integrated device electronics (IDE), enhanced-IDE (E-IDE), direct memory access (DMA), or ultra-DMA). System 100 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

In the exemplary embodiment, main memory 134, hard disk 140 and removable media drive 142 are examples of computer-readable mediums that facilitate holding instructions programmed according to the teachings of the invention, data structures, tables, records and/or other data described herein. The term "computer-readable medium" or "computer-readable media" as used herein refers to any medium that facilitates storing and/or providing instructions to processor 132 for the execution thereof. The computer-readable media may include, but not limited to, non-volatile media, volatile media and transmission media. Non-volatile media may include, but not limited to, hard disks, floppy disks, tape, magneto-optical disks, PROMs (EPROM, EEPROM, flash EPROM), DRAM, SRAM, SDRAM or any other magnetic medium. Moreover, non-volatile media may also include compact discs (e.g., CD-ROM) or any other optical medium. Further, non-volatile media may include punch cards, paper tape or other physical medium with patterns of holes. Volatile media may include dynamic memory, such as main memory 134. Transmission media may include coaxial cables, copper wire and fiber optics, including the wires that make up bus 130. Transmission media may also include carrier waves such as acoustic or light waves that may be generated using radio waves and infrared data communications.

In the exemplary embodiment, the computer-readable media may include software that facilitates controlling system 100. Such software may include, but is not limited to, device drivers, operating systems, development tools and applications software. Such computer-readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

In the exemplary embodiment, system 100 may further include a display controller 144 coupled to bus 130 to control a display 146, such as a cathode ray tube (CRT), liquid crystal display (LCD) or any other type of display to facilitate displaying information to a computer user. System 100 may include a plurality of input devices, such as a keyboard 148 and a pointing device 150, to facilitate interacting with the computer user and providing information to processor 132. Alternatively, a touch screen may be used in conjunction with display 146. In one embodiment, pointing device 150 may be a mouse, a trackball or a pointing stick for communicating direction information and command selections to processor 132 and for controlling cursor movement on display 146. In addition, a printer (not shown) may be coupled to system 100 to facilitate printing data stored and/or generated by system 100.

System 100 also includes a communication interface 152 coupled to bus 130, wherein communication interface 152 may be coupled in communication to LAN 116 or network 110 using network connection 115. In one embodiment, communication interface 152 may be a network interface card that is coupled in communication to any packet switched LAN. In another embodiment, communication interface 152 may be an asymmetrical digital subscriber line (ADSL) card, an integrated services digital network (ISDN) card or a modem to facilitate providing a data communication connection to network connection 115. In yet another embodiment, wireless connections may be used to couple communication interface 152 to LAN 116 and/or network 110. In the exemplary embodiment, communication interface 152 sends and receives electrical, electromagnetic or optical signals that carry digital data to and from system 100, which are exemplary forms of carrier waves that facilitate transporting information. Network connection 115 facilitates providing data communication between web portal 102 and data devices using networks 116 and 130. Specifically, network connection 115 may couple first users 104 and/or second users 106 to web portal 102 using at least one of local network 116 and network 110. System 100 may also transmit and receive data, including program code, through networks 116 and 110 using network connection 115 and communication interface 152. Moreover, network connection 115 may couple server 112 in communication to a mobile device 132 such as a personal digital assistant (PDA), a laptop computer, a cellular telephone, a smart phone, an ultra-compact mobile device or any other mobile device that enables system 100 to function as described herein.

During operation, system 100 may perform a portion or all of the processing steps of the invention in response to processor 132 executing one or more sequences of one or more instructions contained within main memory 134 and/or other forms of computer-readable media. In one embodiment, processor 132 may execute the instructions contained within the computer-readable media. In another embodiment, hard-wired circuitry may be used in place of or in combination with the instructions. Thus, the exemplary embodiments described herein are not limited to any specific combination of hardware circuitry and software. For example, the instructions may initially be carried on a magnetic disk of a remote computer. The remote computer can load the instructions for implementing all or a portion of the present invention remotely into a dynamic memory and send the instructions over a telephone line using a modem. A modem local to system 100 may receive the data on the telephone line and use an infrared transmitter to convert the data to an infrared signal. An infrared detector coupled to bus 130 can receive the data carried in the infrared signal and place the data on bus 130. Bus 130 carries the data to main memory 134, from which processor 132 retrieves and executes the instructions. The instructions received by main memory 134 may optionally be stored on hard disk 140 or removable media drive 142 either before or after execution by processor 132.

Other aspects of the invention may include data transmission and Internet-related activities. See Gralla, Preston, *How the Internet Works*, Ziff-Davis Press (1996), which is hereby incorporated by reference into this patent application. Still other aspects of the invention may utilize wireless data transmission, such as those described in U.S. Pat. Nos. 6,456,645, 5,818,328 and/or 6,208,445, all of which are hereby incorporated by reference into this patent application.

Figure 3:
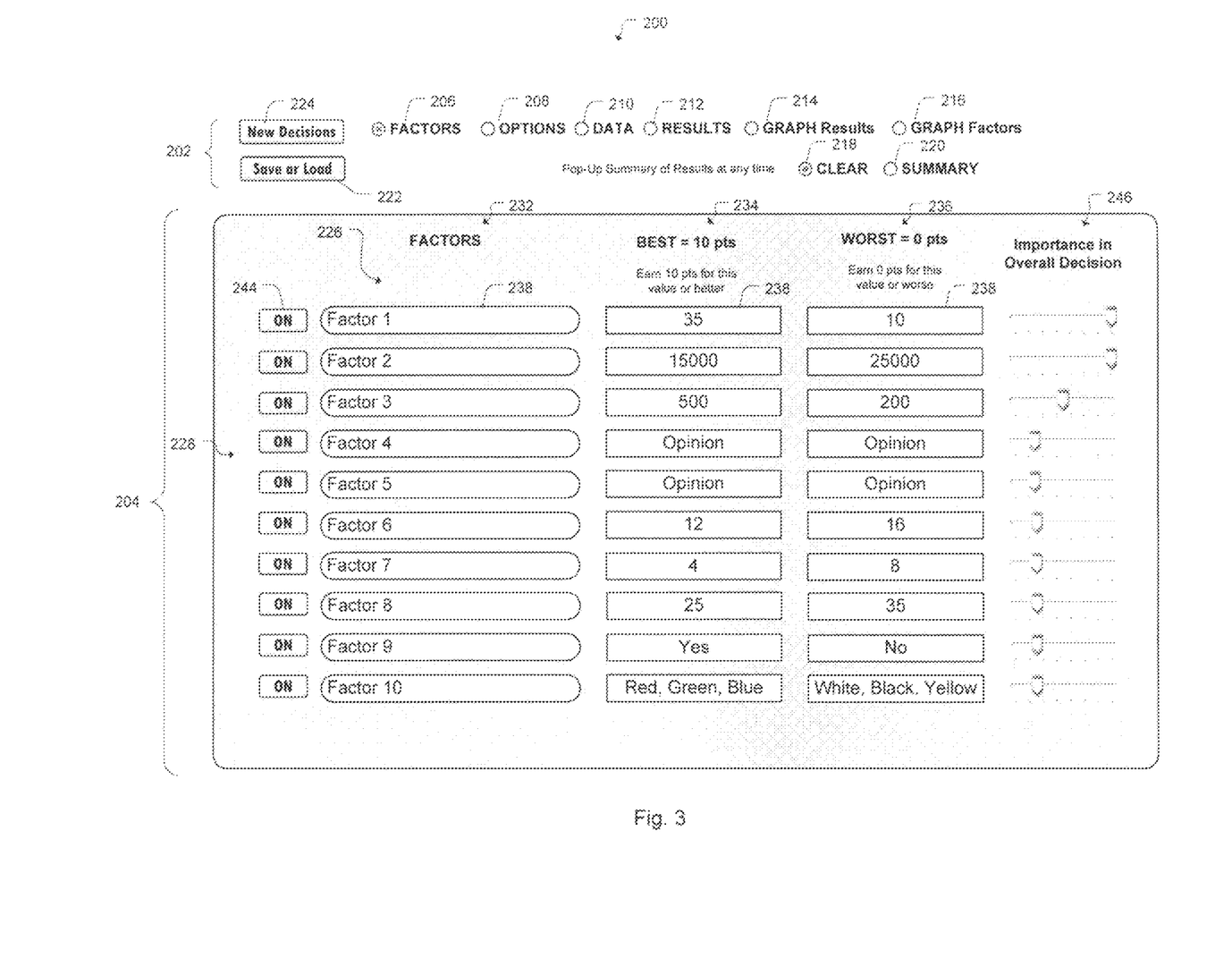
FIG. 3 is an illustration of a factors data entry page that may be used with the system shown in FIG. 1.

FIG. 3 is an illustration of a factors data entry interface page, or factors page 200 that may be used with decision engine 118. In the exemplary embodiment, factors page 200 includes a navigation area 202 and a factor data area 204. Navigation area 202 includes a plurality of radio buttons such as, but not limited to, a factors button 206, an options button 208, a data button 210, a results button 212, a graph results button 214, a graph factors button 216, a clear button 218 and a summary button 220. Each radio button facilitates directing a user to the respective interface page. In the exemplary embodiment, clear button 218 facilitates hiding a score summary pop-up window 294 (shown in FIG. 9) and summary button 220 facilitates displaying score summary pop-up window 294 on the page. Moreover, navigation area 202 may include a save/load button 222 and a new decisions button 224. In the exemplary embodiment, save/load button 222 enables the user to either save their decision analysis progress or load a previously saved decision analysis. Additional information may be included when the user saves their results, such as the ability to choose a destination to save a file to, the ability to name the file to be saved and the ability to include a description of the results. Additionally, engine 118 may allow the user to load saved decision analyses as well as delete prior saved results. Moreover, new decisions button 224 enables the user to begin a new decision analysis.

Factor data area 204 may include a plurality of data columns 226 and at least one data row 228. The plurality of data columns 226 may include, but not limited to, a factors column 232, a first data column 234 and a second data column 236, wherein each column 232, 234 and 236 includes a plurality of data entry fields 238. Each data row 228 may include an ON/OFF toggle button 244, an importance indicator 246 and at least one data entry field 238 associated with columns 232, 234 and 236. In the exemplary embodiment, each ON/OFF button 244 facilitates including or excluding the associated data row 228 from the decision analysis performed by engine 118. Moreover, each importance indicator 246 facilitates indicating the importance of the associated factor that is assigned by the user. In the exemplary embodiment, an aspect of each factor may be indicated in at least one of first and second data columns 234 and 236. Specifically, in one embodiment, an aspect of each factor may be indicated with a range of values. In another embodiment, an aspect of each factor may be indicated as a subjective assessment. In yet another embodiment, an aspect of each factor may be indicated as at least one of a yes/no answer, a true/false answer, a multiple-choice answer and any other type of entry known by one having ordinary skill in the art. For example, in the event that each factor may be quantified, a most desired value may be entered into first data column 234 and a least desired value may be entered into second data column 236. In the event that each factor may be represented as a subjective assessment, the user may enter the word "opinion" in at least one of first and second columns 234 and 236. In the event that each factor may be represented as yes/no or true/false entry, the user may indicate the most desired entry in first data column 234 and the least desired entry in second data column 236.

Figure 4:
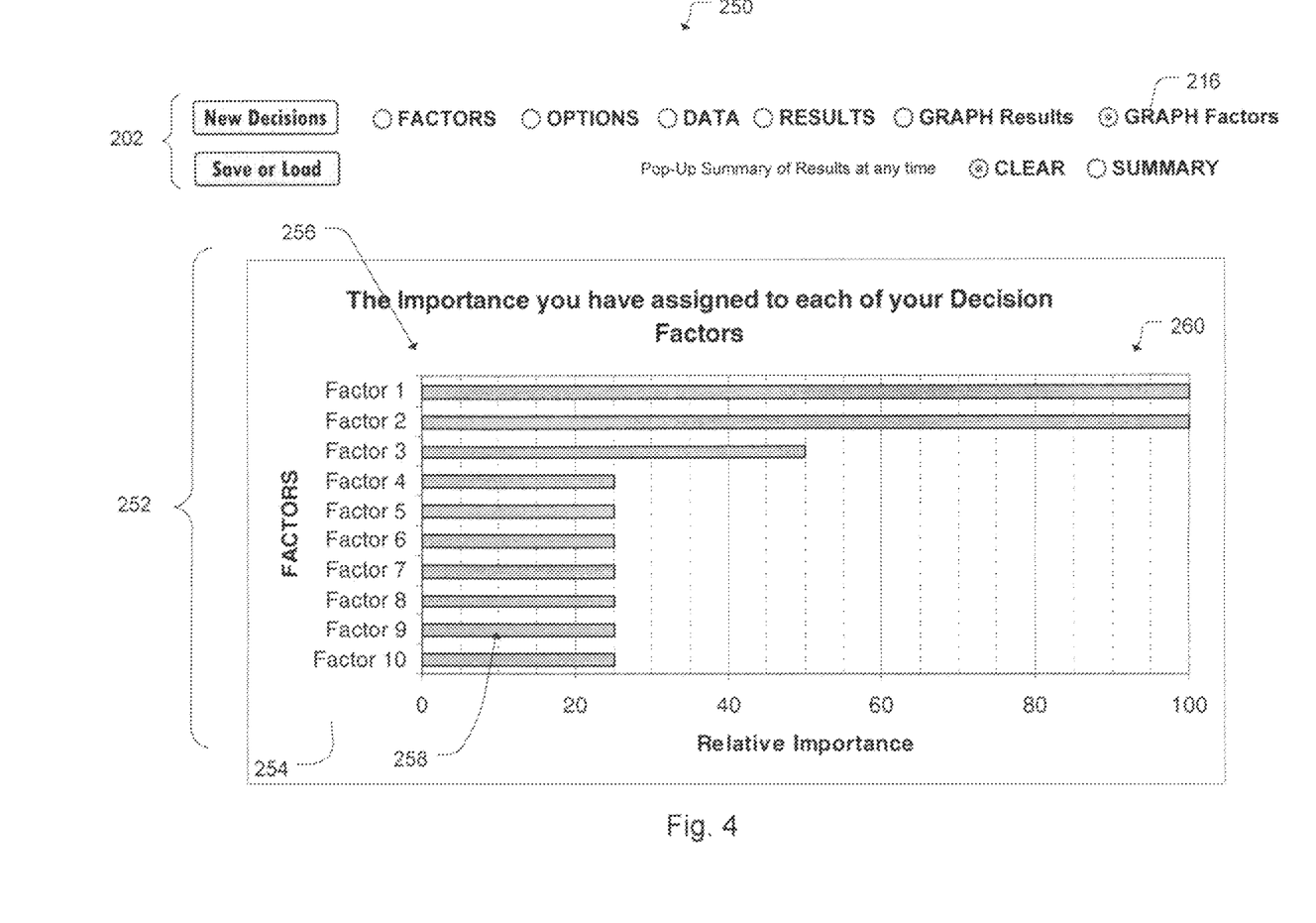
FIG. 4 is an illustration of a graph factors page that may be used with the system shown in FIG. 1.

FIG. 4 is an illustration of a graph factors page 250. In the exemplary embodiment, the user may navigate to graph factors page 250 by clicking graph factors radio button 216 in navigation area 202 included in graph factors page 250. Graph factors page 250 may also include a display area 252 that may include a chart 254 that graphically represents the importance of each factor assigned by the user using importance indicator 246. Specifically, chart 254 includes a y-axis 256 that includes each factor used in the decision process and an x-axis 258 that includes the relative importance of each factor. At least one graph bar 260 is associated with each factor such that graph bar 260 may graphically represent the importance of each factor. Moreover, the relative importance of each factor is displayed by importance percentage basis. In an alternative embodiment, display area 252 may display the factor importance as a pie chart, a list or any other method of displaying information known to one having ordinary skill in the art to enable engine 118 to function as described herein.

Figure 5:
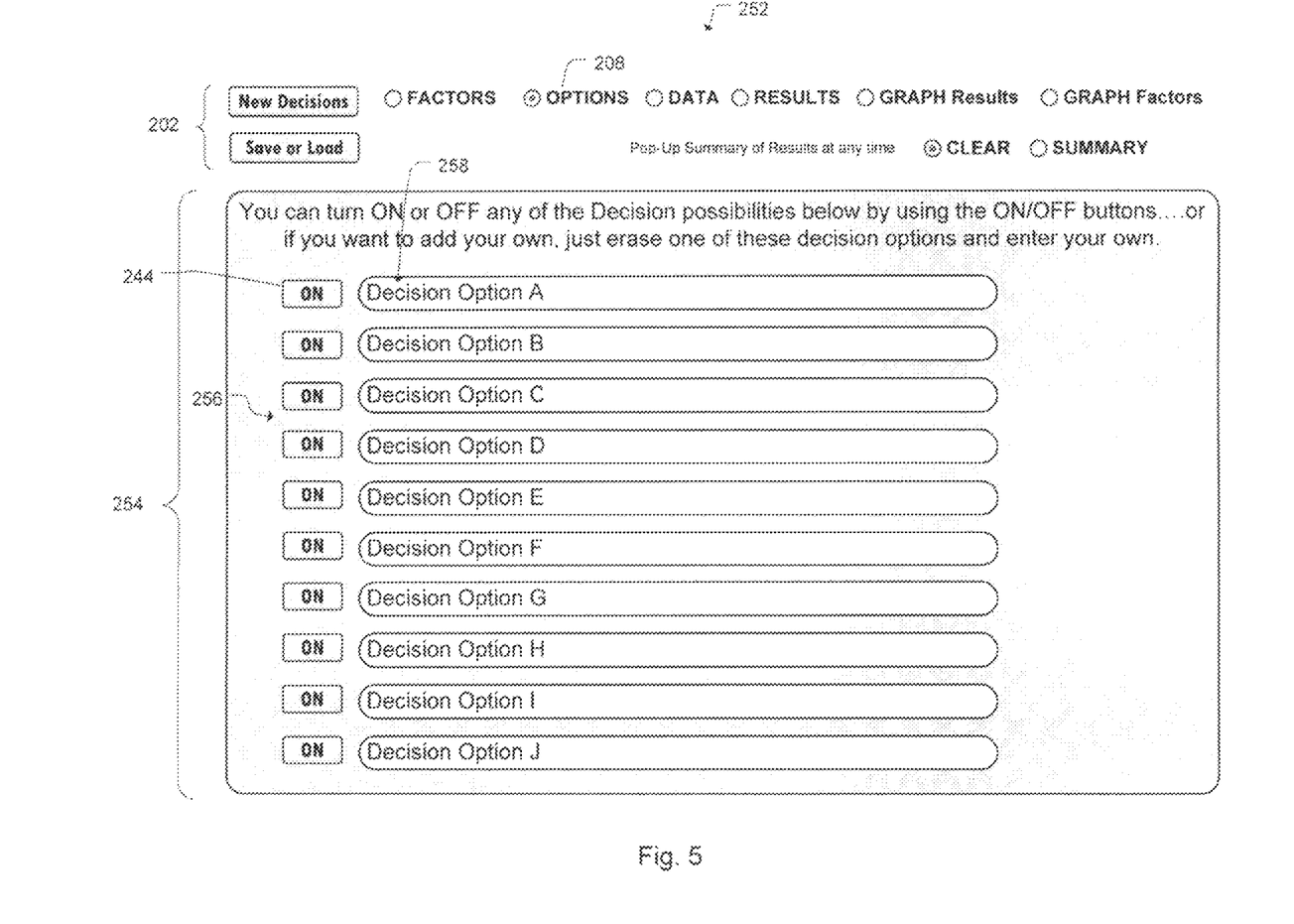
FIG. 5 is an illustration of a decision options page that may be used with the system shown in FIG. 1.

FIG. 5 is an illustration of a decision options page 252. In the exemplary embodiment, the user may navigate to decision options page 252 by clicking options radio button 208 in navigation area 202 included in decision options page 252. Decision options page 252 may also include a decision options area 254 that may include a plurality of data rows 256 that may include a decision option 258 and an ON/OFF toggle button 244 associated therewith. In the exemplary embodiment, and described in more detail below, engine 118 may determine each decision option 258 based on the factors entered by the user in factors page 200. In one embodiment, the user may indicate a broad category of the desired decision options 258 to which each factor may apply. In another embodiment, engine 118 may automatically determine the decision option 258 category that applies based on the factors entered by the user in factors page 200. In yet another embodiment, the user may enter a plurality of decision options 258 and a plurality of factors into system 100 to enable engine 118 to decide on an appropriate decision option 258 based on the entered decision options 258 and factors.

FIG. 6 is an illustration of a raw data page 260. In the exemplary embodiment, the user may navigate to data page 260 by clicking data radio button 210 in navigation area 202 included within data page 260. Data page 260 may also include a data display area 262 that may include at least one data matrix 264. Specifically, data matrix 264 may include a plurality of data columns 266 associated with each decision option 258 determined by engine 118. Moreover, data matrix 264 may include a plurality of data rows 268 associated with each factor entered by the user. In the exemplary embodiment, as described in more detail below, engine 118 determines the objective score or rating for each factor for each decision option 258 and displays the values in matrix form. In the exemplary embodiment, each factor score is non-weighted. As a result, data page 260 displays the raw data to the user. For example, as described in more detail below, in the event the factor score may be quantified, a numeric value is displayed. In the event the factor value is an opinion, the value may be displayed as a subjective assessment using a percent scale. For example, a subjective assessment may be displayed as 8 stars out of 10 stars, as described in more detail below. Further, in the event the factor value may be displayed as a yes/no answer or true/false answer, such an answer is displayed. Moreover, in the event the factor score is a multiple choice answer, a single answer choice that applies to the decision option is displayed. For example, if the factor is a color, then the factor score may be indicated as the specific color of the specific decision option.

Figure 7:
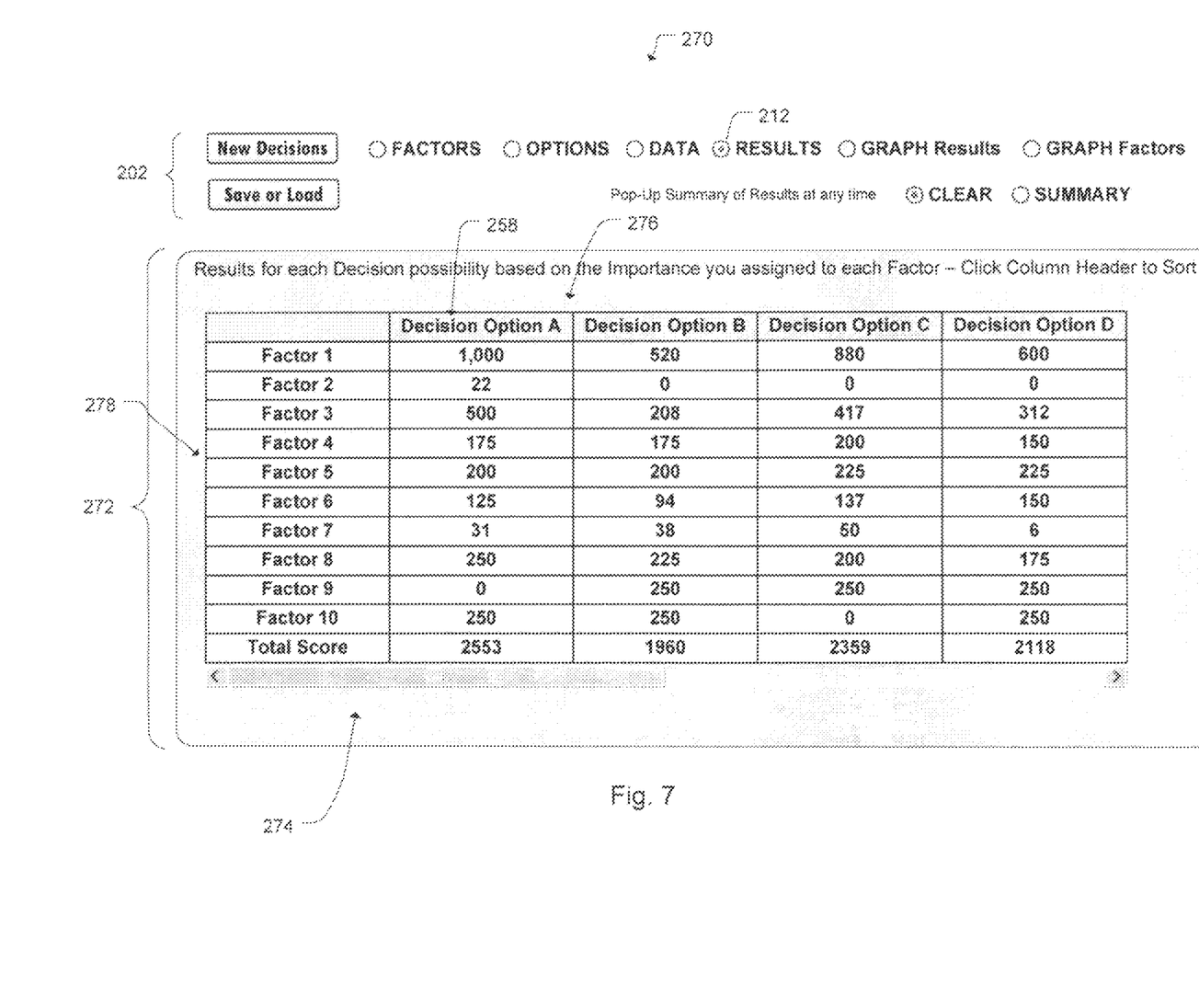
FIG. 7 is an illustration of a score results page that may be used with the system shown in FIG. 1.

FIG. 7 is an illustration of a score results page 270. In the exemplary embodiment, the user may navigate to results page 270 by clicking results radio button 212 in navigation area 202 included within results page 270. Results page 270 may also include a data display area 272 that may include at least one data matrix 274. Specifically, data matrix 274 may include a plurality of data columns 276 associated with each decision option 258 determined by engine 118. Moreover, data matrix 264 may also include a plurality of data rows 278 associated with each factor entered by the user. In the exemplary embodiment, as described in more detail below, engine 118 determines the weighted score of each factor using the non-weighted factor score and the importance assigned to the factor by the user. Each weighted factor score for each decision option 258 is displayed in matrix form. In the exemplary embodiment, each weighted factor score is a numeric number that is used to determine a total score for each decision option 258.

Figure 8:
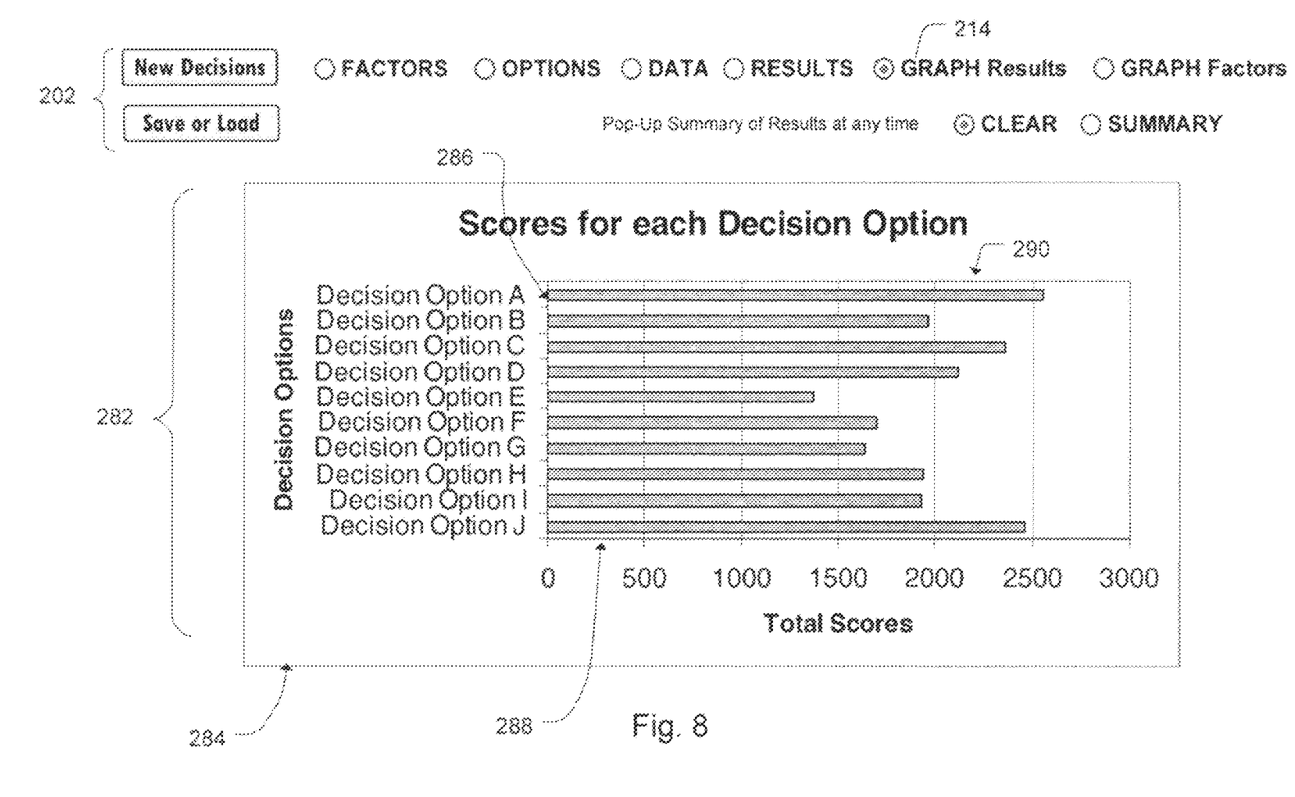
FIG. 8 is an illustration of a graph results page that may be used with the system shown in FIG. 1.

FIG. 8 is an illustration of a graph results page 280. In the exemplary embodiment, the user may navigate to graph results page 280 by clicking graph results radio button 214 in navigation area 202 included in graph results page 280. Graph results page 280 may also include a display area 282 that may include a chart 284 that graphically represents the score of each decision option 258 determined by engine 118. Specifically, chart 284 includes a y-axis 286 that includes a plurality of decision options 258 compared by engine 118 and an x-axis 288 that includes the total scores of each decision option 258. A graph bar 290 is associated with each decision option 258 such that graph bar 290 may graphically represent the total score each decision option 258. In an alternative embodiment, display area 282 may display the total score as a pie chart, a list or any other method of displaying information known to one having ordinary skill in the art to enable system 100 to function as described herein.

Figure 9:
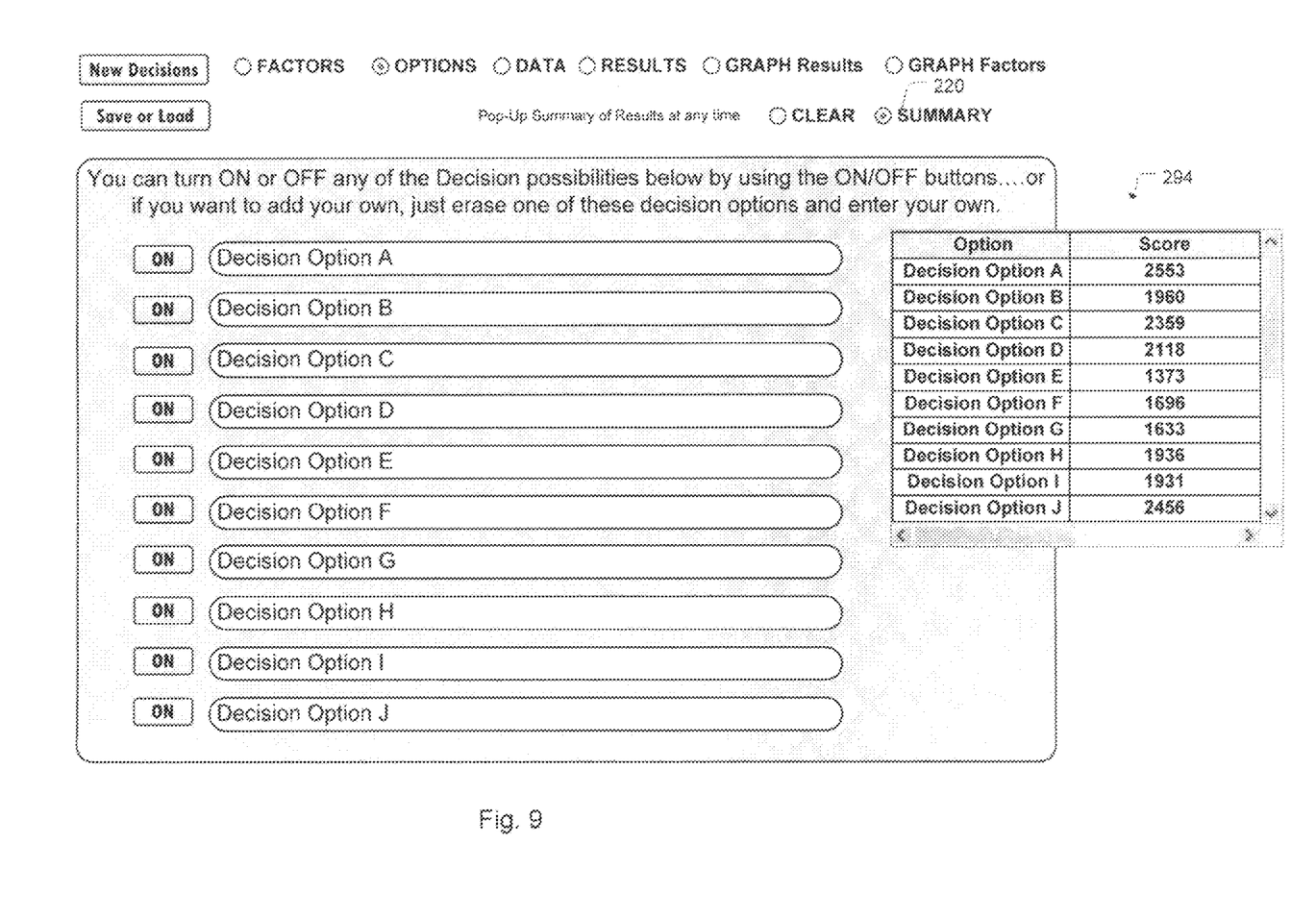
FIG. 9 is an illustration of a page including a pop-up summary window that may be used with the system shown in FIG. 1.

In the exemplary embodiment, once the score for each decision option 258 is determined by engine 118, as shown in FIG. 9, the user may click on summary button 220 to display score summary pop-up window 294 on any page. Score summary pop-up window 294 may include a list of the compared decision options 258 and the scores associated with each decision option 258.

Figure 10:
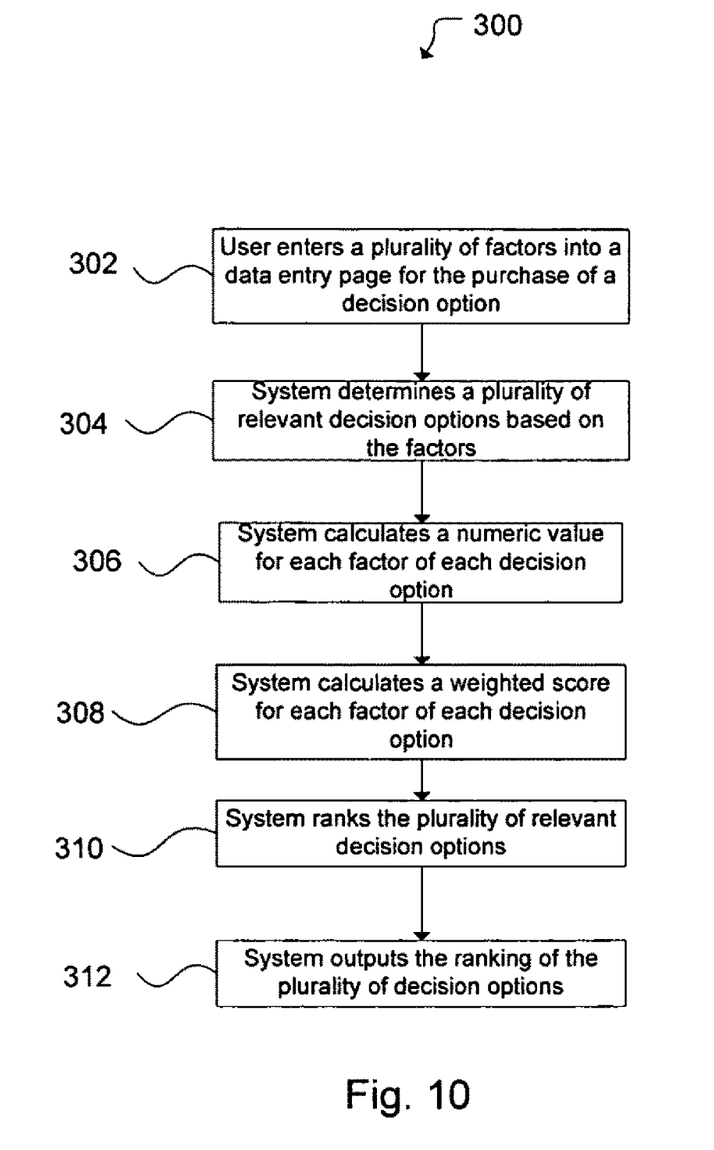
FIG. 10 is a flowchart of a method of comparing different options using the system shown in FIG. 1.

FIG. 10 is a flow chart of exemplary method 300 of comparing different options using system 100. During operation, a user desiring to decide on a decision option may utilize system 100, and more specifically engine 118, to facilitate determining which decision option to choose. In one embodiment, system 100 may be utilized or implemented on network 110, such as, but not limited to, the Internet. Engine 118 may be used with decision analyses including, but not limited to, the purchase of any type of products or services, the purchase of any type of real estate, deciding which school to attend, deciding which career to pursue or any other type of decision analysis. In the exemplary embodiment, the user may begin a new decision analysis by clicking new decisions button 224 in any of the pages shown in FIGS. 3-9. In method step 302, the user may then navigate to factors page 200, as shown in FIG. 3, by clicking factors radio button 206, wherein the user may enter a plurality of factors, corresponding to various aspects of the desired decision option, into factors column 232. Moreover, the user may enter specific data for each factor into first data column 234 and/or second data column 236. The factor data may be quantified by engine 118 according to an importance level assigned to each factor by the user using importance indicator 246. In method step 304, once the user has entered the plurality of factors, the factor data and assigned the importance level of each factor, engine 118 may determine a plurality of decision options 258 to be analyzed and compared in the decision analysis, as shown in FIG. 4.

Although engine 118 may be used with any decision analysis, a non-limiting example pertaining to deciding which automobile the user should purchase is used to describe the operation of engine 118. In this non-limiting example, engine 118 may analyze and compare various aspects of automobiles to enable the user to make a decision on which automobile to purchase. Specifically, the plurality of factors may represent various aspects of automobiles that the user may use to analyze and compare potential automobiles. For example, factors 1-10 shown in FIG. 3 may represent, miles per gallon (MPG), cost, miles per tank, interior noise level, appearance, quarter mile time, 0-60 miles per hour (MPH) time, turning radius, anti-lock braking system (ABS) and exterior color, respectively. Once the user enters the plurality of automobile factors into factors column 232 in factors page 200, the user may enter unique factor data for each factor in at least one of first and second columns 234 and 236.

In the non-limiting vehicle purchasing example, the unique factor data may represent aspects of a potentially acceptable automobile that the user would purchase. In the exemplary embodiment, at least one factor may be represented as a range. For example, the user may be interested in an automobile that can travel between a range of about 10 to about 35 miles per gallon and cost between a range of about $15,000 to about $25,000. Moreover, at least one other factor may be represented as a subjective assessment, a yes/no answer, a true/false answer or a multiple-choice answer. In one embodiment, an automobile factor that may be a subjective assessment may include interior noise level or appearance. In such an embodiment, the user may enter "opinion" in at least one of first and second data columns 234 and 236 for the interior noise level factor. In another embodiment, a factor that may include a yes/no or true/false answer may be whether the automobile has anti-lock brakes installed. In such an embodiment, in the event the user desires an automobile that includes anti-lock brakes, the user may enter "yes" as the best answer in first data column 234 and "no" as the worst answer in second data column 236. In yet another embodiment, a factor that may include a multiple-choice answer may be the color of the automobile. In such an embodiment, the user may enter "red, green and blue" as the most desired colors in first data column 234 and "white, black and yellow" as the least desired colors in second data column 236. Lastly, once the user has entered the unique factor data for each factor, the user may assign the importance level to each factor using importance indicator 246. After the importance level of each factor have been assigned, the user may view a graphical representation of the importance levels of each factor by navigating to graph factors page 250 by clicking the graph factors radio button 216 on any page shown in FIGS. 3-9.

Once the user has entered the plurality of factors, entered the factor data and assigned the importance level to each factor in factors page 200, engine 118 may determine a plurality of decision options and output those options in decision options page 252, for example as shown in FIG. 5. In one embodiment, information for a plurality of decision options, such as but not limited to products, may be located on the Internet. In one embodiment, engine 118 may search the Internet or any other network or database for decision option information, which has been tagged and therefore searchable using an Internet search engine or any other tool. In the exemplary embodiment, ten decision options 258 may be returned and displayed in decision options page 252. Alternatively, any number of decision options 258 may be returned. In the non-limiting vehicle purchasing decision example, decision options A-J may represent different makes and/or models of vehicles that engine 118 determined were relevant to the decision analysis. In the exemplary embodiment, each determined decision option 258 is displayed on a corresponding data row 256 that includes ON/OFF button 244 associated therewith. The user may include the determined decision option 258 in the decision analysis by switching ON/OFF 244 button to "ON" or exclude the determined decision option 258 by switching ON/OFF 244 button to "OFF". In the exemplary embodiment, all ON/OFF buttons 244 are switched to "ON" which means that all of decision options A-J will be analyzed and compared in the decision analysis. Alternatively, the user may manually provide the plurality of decision options 258 to engine 118.

Once the plurality of decision options 258 have been determined by engine 118, the factor data for each decision option 258 may be displayed in data page 260, as shown in FIG. 6. In the non-limiting vehicle purchasing decision example, the aspects of each automobile are displayed in data page 260. For example, decision option A, or automobile A, gets 42 MPG, costs $24,777, gets 600 miles per tank, received 7 out of 8 stars for interior noise level and has an exterior color of red.

Referring back to FIG. 10, in method step 306, system 100, and more specifically engine 118 may calculate a numeric value, or raw value, that represents the overall desirability of each factor. Specifically, engine 118 may calculate a numeric value of the data entered in first data column 234 that represents a best or most desirable value. Further, engine 118 may calculate a numeric value of the factor data entered in second data column 236 that represents a worst or least desirable value. For example, engine 118 may calculate a numeric value of 10, or any other value that represents the best or most desirable value, for factors that include data that is equal to or greater than the data entered in first data column 234. Similarly, engine 118 may calculate a numeric value of 0, or any other value that represents the worst or least desirable value, for factors that include data that is equal to or less than the data entered in second data column 236. Moreover, engine 118 may calculate a corresponding numeric value for factors that include data that is between the best and worst values entered in first and second data columns 234 and 236 using an algorithm such as linear computation. In the non-limiting vehicle purchasing decision example, for factor 1, or MPG, the user entered a most desirable MPG of 35 and a least desirable MPG of 10. In such an example, engine 118 may calculate a numeric value of 5 for a decision option having an MPG of 22.5, a numeric value of 2.5 for a decision option having an MPG of 16.25, a numeric value of 7.5 for a decision option having an MPG of 28.75 and so forth and so on. Alternatively, factor data that falls between the best and worst desired values entered in first and second data columns 234 and 236 may have numeric values assigned by engine 118 using polynomial computation, logarithmic computation, power computation, exponential computation, moving average computation or any other computation method that enables engine 118 to function as described herein.

In the non-limiting vehicle purchasing decision example, for factor 4, or interior noise level, the user entered "opinion" in at least one of first and second data column 234 and 236, shown in FIG. 3. In the event the decision option 258 includes a subjective assessment or review from a third party that assessment may be used to calculate a numeric value. For example, in one embodiment, the third party automobile review agency may determine that a particular vehicle has a relatively low amount of interior noise and therefore award 7 stars to that vehicle for interior noise. In such an example, engine 118 may calculate the rating percent and convert that percent to the numeric number. For example, 7 out of 10 stars would equal a 70% interior noise rating. Engine 118 may then calculate the interior noise factor as 7. In the event the decision option 258 does not include a subjective assessment for a third party that may be used to calculate a numeric value, engine 118 may inform the user that no numeric value was calculated for that particular factor.

In the non-limiting vehicle purchasing decision example, for factor 9, or ABS, the user entered "yes", or "true", in first data column 234 and "no", or "false", in second data column 236. In such an example, in the event a vehicle includes ABS, the engine 118 may calculate a numeric value of 10 for factor 9. In the event a vehicle does not include ABS, then engine 118 may calculate a numeric value of 0 for factor 9.

In the non-limiting vehicle purchasing decision example, for factor 10, or exterior vehicle color, the user entered "red, green, blue" in first data column 234 and "white, black, yellow" in second data column 236. In such an example, in the event a vehicle includes an exterior color of red, green or blue, engine 118 may calculate a numeric value of 10 for factor 10. In the event the vehicle includes an exterior color of white, black or yellow, engine 118 may calculate a numeric value of 0 for factor 10. Further, in the event that the vehicle color is neither, red, green, blue, white, black nor yellow, engine 118 may alert the user of the vehicle's color.

In the event the user wishes to exclude a factor from the decision analysis, the user may switch ON/OFF button 240 in the factors page 200 to "OFF" for the factor. As a result, engine 118 will not consider that factor in the decision analysis.

In method step 308, once the numeric value of each factor of each decision option 258 is calculated, system 100, and more specifically engine 118 may calculate a weighted score for each factor using the importance assigned to each factor by the user. Scores of each factor may be weighted in any manner, for example by applying a higher weight to scores for factors having a greater importance to the user. Further, the weighted scores can be based on any scaling method and should not be limited to the numbers or scales shown herein. In the non-limiting vehicle purchasing decision example, the user ranks factor 1 and 2, or MPG and cost, as the most important factors in the decision analysis and therefore assigns an importance ranking of 100 to factors 1 and 2. Further, in the exemplary embodiment, the user assigned an importance value of 50 to factor 3, or miles per tank. Moreover, the user assigned an importance value of 25 to factors 4-10. As a result, in this example, the user desires an affordable automobile that achieves substantially good gas mileage and may be driven a relatively far distance on a single tank of gas. However, other factors, such as interior noise level, acceleration, turning radius and ABS braking are other factors that, while not as important as cost, MPG and miles per tank, they may influence the decision of the user in one way or another.

For example, factor 1, or MPG factor of decision option A, gets 42 MPG. The user indicated that the most desirable MPG for an automobile is 35 MPG. The MPG factor for automobile A is greater than the most desired value and as a result, MPG factor receives a score of 10. Further, the user assigned an importance of 100 for the MPG factor. As a result, the MPG score is multiplied by the importance level. As such, the exemplary weighted score for the MPG factor for automobile A is 10×100=1000, as shown in FIG. 7. In the event the MPG was 22.5, as described above, the MPG score would be 5 and the weighted score would be 5×100=500. Moreover, the interior noise level factor received 7 out of 10 stars, therefore, receiving a score of 7. The user assigned an importance level of 25 for this factor. As a result, the weighted score of the interior noise level is 7×25=175. Further, the exterior color of automobile A is red, resulting in a score of 10. The user assigned an importance level of 25 to this factor. As such, the weighted score of the exterior color factor is 10×25=250. Similar calculations are performed for all desired decision options.

Once the weighted score for each factor is calculated by engine 118, the score for each factor and total score for each decision option 258 may be displayed in results page 270, as shown in FIG. 7. In the exemplary embodiment, each automobile, or decision option 258, is displayed with the weighted score of each factor. Moreover, the total score of each automobile is calculated by engine 118 and displayed for each decision option 258. In the non-limiting vehicle purchasing decision example, decision option A, or automobile A, received a total score of 2553, automobile B received a total score of 1960, automobile C received a total score of 2359 and automobile D received a total score of 2118.

In method step 310, as shown in FIG. 10, engine 118 ranks each decision option based on the total score. In method step 312, engine 118 displays a graphical representation of the total scores of each decision option, or automobile, may be displayed in graph results page 280, as shown in FIG. 8. In one embodiment, engine 118 may display the ranks of each decision option based on the total score. Once the total scores of each decision option or automobile are calculated by engine 118, the user may display summary pop-up window 294 on any page by clicking summary button 220, as shown in FIG. 9. Alternatively, summary pop-up window may display any decision analysis information. As such, the user may interpret from FIG. 8 that automobiles options A and J include a majority of the user's desired factors. As a result, system 100 enables the user to choose a decision option based on at least one factor.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of comparing a plurality of decision options, said method implemented on a computing device programmable to perform the steps comprising:

entering a plurality of factors;

determining a plurality of decision options based on the plurality of factors through a search of a database by an engine;

calculating a numeric value for the plurality of factors based on the plurality of factors received, the plurality of decision options determined and the information obtained from the search of the database;

calculating a weighted score for each factor of each decision option;

ranking each decision option based on the total score of each factor; and outputting the rankings for each decision option.

2. A method in accordance with claim 1 further comprising entering factor data for each of the factors.

3. A method in accordance with claim 1 further comprising calculating a numeric value for each of the factors.

4. A method in accordance with claim 1 further comprising entering an importance level for each of the factors.

5. A method in accordance with claim 4 further comprising calculating a weighted score for each of the factors based on the importance level for each of the factors.

6. A method in accordance with claim 5 further comprising calculating a total score for each decision option based on the weighted score of each of the factors.

7. A method in accordance with claim 1 wherein the plurality of decision options include at least one of a plurality of products and services.

8. A computer program embodied on one of non-volatile or volatile media comprising at least one code segment configured to instruct a computer to:

receive a plurality of factors;

determine a plurality of decision options based on the plurality of factors through a search of a database by an engine;

calculate a numeric value for the plurality of factors based on the plurality of factors received, the plurality of decision options determined and the information obtained from the search of the database;

calculate a weighted score for each factor of each decision option;

rank the plurality of decision options based on the total score of each factor; and output the rank of the plurality of decision options.

9. A computer program in accordance with claim 8 wherein the computer program further comprises at least one code segment configured to receive an importance level for each of the factors.

10. A computer program in accordance with claim 9 wherein the computer program further comprises at least one code segment configured to calculate a weighted score for each of the factors based on the importance level of each of the factors.

11. A computer program in accordance with claim 10 wherein the computer program further comprises at least one code segment configured to calculate a total score for each decision option based on the weighted score of each of the factors.

12. A computer program in accordance with claim 8 wherein the computer program further comprises at least one code segment configured to receive factor data for each of the factors.

13. A computer program in accordance with claim 8 wherein the computer program further comprises at least one code segment configured to calculate a numeric value for each of the factors.

14. A decision making system comprising:

at least one server coupled in communication with at least one first party and at least one second party, the at least one server is configured to:

receive a plurality of factors;

determine a plurality of decision options based on the plurality of factors through a search of a database by an engine;

calculate a numeric value for the plurality of factors based on the plurality of factors received, the plurality of decision options determined and the information obtained from the search of the database;

calculate a weighted score for each factor of each decision option;

rank the plurality of decision options based on the total score of the plurality of factors of each decision option; and output the rank of the plurality of decision options.

15. A decision making system in accordance with claim 14 wherein the server is further configured to calculate a numeric value for each of the factors.

16. A decision making system in accordance with claim 14 wherein the server is further configured to receive factor data for each of the factors.

17. A decision making system in accordance with claim 14 wherein the server is further configured to determine a plurality of decision options that include at least one of a plurality of products and services.

18. A decision making system in accordance with claim 14 wherein the server is further configured to receive an importance level of each of the factors.

19. A decision making system in accordance with claim 18 wherein the server is further configured to calculate a weighted score for each of the factors based on the importance level for each of the factors.

20. A decision making system in accordance with claim 19 wherein the server is further configured to calculate a total score for each decision option based on the weighted score of each of the factors.

* * * * *